(12) United States Patent
Xue et al.

(10) Patent No.: US 12,522,852 B2
(45) Date of Patent: Jan. 13, 2026

(54) METHOD FOR PREPARING L-GLUFOSINATE AMMONIUM BY BIOLOGICAL ENZYMATIC DE-RACEMIZATION, GLUFOSINATE AMMONIUM DEHYDROGENASE MUTANT AND USE THEREOF

(71) Applicant: ZHEJIANG UNIVERSITY OF TECHNOLOGY, Hangzhou (CN)

(72) Inventors: Yaping Xue, Hangzhou (CN); Feng Cheng, Hangzhou (CN); Chenghao Cao, Hangzhou (CN); Yuguo Zheng, Hangzhou (CN); Shuping Zou, Hangzhou (CN); Jianmiao Xu, Hangzhou (CN)

(73) Assignee: ZHEJIANG UNIVERSITY OF TECHNOLOGY, Hangzhou (CN)

( * ) Notice: Subject to any disclaimer, the term of this patent is extended or adjusted under 35 U.S.C. 154(b) by 629 days.

(21) Appl. No.: 17/910,787

(22) PCT Filed: Dec. 26, 2020

(86) PCT No.: PCT/CN2020/139768
§ 371 (c)(1),
(2) Date: Sep. 9, 2022

(87) PCT Pub. No.: WO2021/184883
PCT Pub. Date: Sep. 23, 2021

(65) Prior Publication Data
US 2023/0111631 A1   Apr. 13, 2023

(30) Foreign Application Priority Data
Mar. 18, 2020  (CN) .......................... 202010191945.1

(51) Int. Cl.
| | | |
|---|---|---|
| C12P 41/00 | (2006.01) |
| C12N 1/21 | (2006.01) |
| C12N 9/02 | (2006.01) |
| C12N 9/04 | (2006.01) |
| C12N 9/06 | (2006.01) |
| C12N 9/08 | (2006.01) |
| C12P 13/04 | (2006.01) |

(52) U.S. Cl.
CPC .......... *C12P 41/002* (2013.01); *C12N 9/0006* (2013.01); *C12N 9/0008* (2013.01); *C12N 9/0024* (2013.01); *C12N 9/0065* (2013.01); *C12P 13/04* (2013.01); *C12Y 101/01001* (2013.01); *C12Y 101/9901* (2013.01); *C12Y 102/01002* (2013.01); *C12Y 104/03003* (2013.01); *C12Y 111/01006* (2013.01)

(58) Field of Classification Search
None
See application file for complete search history.

(56) References Cited

U.S. PATENT DOCUMENTS

2021/0024902 A1* 1/2021 Tian ..................... C12N 9/0016

FOREIGN PATENT DOCUMENTS

| | | |
|---|---|---|
| CN | 109609475 | 4/2019 |
| CN | 109750009 | 5/2019 |
| CN | 110343676 | 10/2019 |
| CN | 110592036 | 12/2019 |
| CN | 110791484 | 2/2020 |
| CN | 110885803 | 3/2020 |
| WO | WO2016050959 | 4/2016 |
| WO | WO2019018406 | 1/2019 |

OTHER PUBLICATIONS

Cheng et al., Tuning amino acid dehydrogenases with featured sequences for L-phosphinothricin synthesis by reductive amination, J. Biotechnol. 312, 2020, 35-43. (Year: 2020).*

Zhang et al., Expanding metabolism for total biosynthesis of the nonnatural amino acid L-homoalanine, PNAS 107, 2010, 6234-39. (Year: 2010).*

Uniprot, Accession No. V9UUT7, 2019, www.uniprot.org. (Year: 2019).*

* cited by examiner

*Primary Examiner* — Todd M Epstein
(74) *Attorney, Agent, or Firm* — Jiwen Chen; Joywin IP Law PLLC

(57) ABSTRACT

The present invention discloses a method for preparing L-glufosinate ammonium by biological enzymatic de-racemization, a glufosinate ammonium dehydrogenase mutant and a use thereof. The method for preparing L-glufosinate ammonium by biological enzymatic de-racemization includes catalyzing D,L-glufosinate ammonium as a raw material by a multi-enzyme catalysis system to obtain L-glufosinate ammonium. The enzyme catalysis system includes D-amino acid oxidase for catalyzing D-glufosinate ammonium in the D,L-glufosinate ammonium to 2-carbonyl-4-[hydroxy(methyl)phosphonyl]butanoic acid, and a glufosinate ammonium dehydrogenase mutant for catalytically reducing 2-carbonyl-4-[hydroxy(methyl)phosphonyl] butanoic acid to L-glufosinate ammonium. The glufosinate ammonium dehydrogenase mutant is obtained by mutation of glufosinate-ammonium dehydrogenase in wild fungi *Thiopseudomonas denitrificans* at a mutation site of V377S. The glufosinate ammonium dehydrogenase mutant in the present invention has better catalytic efficiency. When racemic D, L-glufosinate ammonium is used as a substrate for a catalytic reaction, the conversion rate is much higher than the conversion rate of a wild-type enzyme, and the yield of 2-carbonyl-4-[hydroxy(methyl)phosphonyl]butanoic acid (PPO for short) is also greatly improved.

8 Claims, 1 Drawing Sheet

Specification includes a Sequence Listing.

SEQUENCE LISTING

```
<160> NUMBER OF SEQ ID NOS: 30

<210> SEQ ID NO 1
<211> LENGTH: 1335
<212> TYPE: DNA
<213> ORGANISM: Artificial Sequence
<220> FEATURE:
<223> OTHER INFORMATION: Synthesized

<400> SEQUENCE: 1
atgtcctatt cattggacag cttcctgcag catatcaaac agcgcgatcc agaacagcct      60
gaattccacc aagcagtcga ggaagtactt cgtactttgt ggcccttcct gcaagaaaat     120
ccaaagtatg tgcagaatgg tatcatcgag cgcatggtag aaccagaacg cgttatcctt     180
ttccgtgtcc cttgggtaga tgacgccgga cgtgtacacg taaatcgcgg ataccgtatt     240
cagatgagta gcgcaattgg gccttacaag ggaggaatcc gcttccaccc ttccgtcaac     300
ttaggtgtcc ttaagttttt ggcttttgaa caagttttca agaattctct gacgagtctg     360
ccgatgggcg gggggaaagg cggagcggac tttgacccga aaggaaagtc agagcaggaa     420
gtaatgcgtt tttgccagtc ctttatgaac gagctttatc gccacattgg ccaacacttg     480
gatgtgcccg caggcgacat tggtgtgggg gcgcgtgaag ttggttatat gttcggacaa     540
tataagcgtc ttgccaacga gttcacttca gtcttcactg ggaaagggat gacgtatggt     600
gggtcactga ttcgtccgga ggctaccgga tatggttgcg tttatttgc cgagcagatg     660 cttaagtcca tcaaacgccg ttttgaggga cagcgcgtcg ccatctccgg gtctggcaac     720
gtcgctcagt acgccgccca aaaagtcacc gagcttggcg gtaaagttgt ctcactttca     780
```

```
gattcggggg gaacgctgta catgccagaa ggtttgaatg gggaacattg ggcgtatttg    840
atggatctta agaccgttcg tcgcgggcgc attgaagaga tggcgcgcga gttcggtgcc    900
cagttcttcc ctgggcaacg tccttggcat ctggagtgcg atatcgctat gccgtgtgcg    960
acccaaaatg aactgaatgg ggatgacgct cgccagttga ttaaaaatgg ttgcgtatgc   1020
gttgccgagg gagccaatat gccttccacc cttgaggcca ttgatttgtt ccaagaagcg   1080
ggcatcttgt ttgcgccagg gaaagcgtct aatgcgggtg tgtcgcagt atcagggtta   1140 gagatgacgc aaaatgcaat gcgccttttta tggacagatg gggaggtaga cgccaagctt   1200
cactcgatta tgcaagggat tcacgcatca tgtgttaatt atggtacaga aaatggaaaa   1260
gtcaattatg tcaagggagc taatatcgct gggtttgtaa aggtcgccga cgcgatgctt   1320
gcgcagggaa tcgtc                                                     1335
```

<210> SEQ ID NO 2
<211> LENGTH: 445
<212> TYPE: PRT
<213> ORGANISM: Thiopseudomonas denitrificans

<400> SEQUENCE: 2

```
Met Ser Tyr Ser Leu Asp Ser Phe Leu Gln His Ile Lys Gln Arg Asp
1               5                   10                  15

Pro Glu Gln Pro Glu Phe His Gln Ala Val Glu Glu Val Leu Arg Thr
            20                  25                  30

Leu Trp Pro Phe Leu Gln Glu Asn Pro Lys Tyr Val Gln Asn Gly Ile
        35                  40                  45

Ile Glu Arg Met Val Glu Pro Glu Arg Val Ile Leu Phe Arg Val Pro
    50                  55                  60

Trp Val Asp Asp Ala Gly Arg Val His Val Asn Arg Gly Tyr Arg Ile
65                  70                  75                  80

Gln Met Ser Ser Ala Ile Gly Pro Tyr Lys Gly Gly Ile Arg Phe His
                85                  90                  95

Pro Ser Val Asn Leu Gly Val Leu Lys Phe Leu Ala Phe Glu Gln Val
            100                 105                 110

Phe Lys Asn Ser Leu Thr Ser Leu Pro Met Gly Gly Gly Lys Gly Gly
        115                 120                 125

Ala Asp Phe Asp Pro Lys Gly Lys Ser Glu Gln Glu Val Met Arg Phe
    130                 135                 140

Cys Gln Ser Phe Met Asn Glu Leu Tyr Arg His Ile Gly Gln His Leu
145                 150                 155                 160

Asp Val Pro Ala Gly Asp Ile Gly Val Gly Ala Arg Glu Val Gly Tyr
                165                 170                 175

Met Phe Gly Gln Tyr Lys Arg Leu Ala Asn Glu Phe Thr Ser Val Phe
            180                 185                 190

Thr Gly Lys Gly Met Thr Tyr Gly Gly Ser Leu Ile Arg Pro Glu Ala
        195                 200                 205

Thr Gly Tyr Gly Cys Val Tyr Phe Ala Glu Gln Met Leu Lys Ser Ile
    210                 215                 220

Lys Arg Arg Phe Glu Gly Gln Arg Val Ala Ile Ser Gly Ser Gly Asn
225                 230                 235                 240

Val Ala Gln Tyr Ala Ala Gln Lys Val Thr Glu Leu Gly Gly Lys Val
                245                 250                 255

Val Ser Leu Ser Asp Ser Gly Gly Thr Leu Tyr Met Pro Glu Gly Leu
            260                 265                 270
```

Asn Gly Glu His Trp Ala Tyr Leu Met Asp Leu Lys Thr Val Arg Arg
           275                 280                 285

Gly Arg Ile Glu Glu Met Ala Arg Glu Phe Gly Ala Gln Phe Phe Pro
       290                 295                 300

Gly Gln Arg Pro Trp His Leu Glu Cys Asp Ile Ala Met Pro Cys Ala
305                 310                 315                 320

Thr Gln Asn Glu Leu Asn Gly Asp Asp Ala Arg Gln Leu Ile Lys Asn
               325                 330                 335

Gly Cys Val Cys Val Ala Glu Gly Ala Asn Met Pro Ser Thr Leu Glu
               340                 345                 350

Ala Ile Asp Leu Phe Gln Glu Ala Gly Ile Leu Phe Ala Pro Gly Lys
               355                 360                 365

Ala Ser Asn Ala Gly Gly Val Ala Val Ser Gly Leu Glu Met Thr Gln
       370                 375                 380

Asn Ala Met Arg Leu Leu Trp Thr Asp Gly Glu Val Asp Ala Lys Leu
385                 390                 395                 400

His Ser Ile Met Gln Gly Ile His Ala Ser Cys Val Asn Tyr Gly Thr
               405                 410                 415

Glu Asn Gly Lys Val Asn Tyr Val Lys Gly Ala Asn Ile Ala Gly Phe
           420                 425                 430

Val Lys Val Ala Asp Ala Met Leu Ala Gln Gly Ile Val
           435                 440                 445

<210> SEQ ID NO 3
<211> LENGTH: 1335
<212> TYPE: DNA
<213> ORGANISM: Artificial Sequence
<220> FEATURE:
<223> OTHER INFORMATION: Synthesized

<400> SEQUENCE: 3
atgtcctatt cattggacag cttcctgcag catatcaaac agcgcgatcc agaacagcct      60
gaattccacc aagcagtcga ggaagtactt cgtactttgt ggcccttcct gcaagaaaat     120
ccaaagtatg tgcagaatgg tatcatcgag cgcatggtag aaccagaacg cgttatcctt     180
ttccgtgtcc cttgggtaga tgacgccgga cgtgtacacg taaatcgcgg ataccgtatt     240
cagatgagta gcgcaattgg gccttacaag ggaggaatcc gcttccaccc ttccgtcaac     300
ttaggtgtcc ttaagttttt ggcttttgaa caagttttca agaattctct gacgagtctg     360
ccgatgggcg gggggaaagg cggagcggac tttgacccga aggaaagtc agagcaggaa      420 gtaatgcgtt tttgccagtc ctttatgaac gagctttatc gccacattgg ccaacacttg     480
gatgtgcccg caggcgacat tggtgtgggg gcgcgtgaag ttggttatat gttcggacaa     540
tataagcgtc ttgccaacga gttcacttca gtcttcactg ggaaagggat gacgtatggt     600
gggtcactga ttcgtccgga ggctaccgga tatggttgcg tttatttgc cgagcagatg      660 cttaagtcca tcaaacgccg ttttgaggga cagcgcgtcg ccatctccgg gtctggcaac     720
gtcgctcagt acgccgccca aaaagtcacc gagcttggcg taaagttgt ctcactttca      780 gattcggggg gaacgctgta catgccagaa ggtttgaatg ggaacattg gcgtatttg       840 atggatctta agaccgttcg tcgcgggcgc attgaagaga tggcgcgcga ttcggtgcc      900 cagttcttcc ctgggcaacg tccttggcat ctggagtgcg atatcgctat gccgtgtgcg     960
acccaaaatg aactgaatgg ggatgacgct cgccagttga ttaaaaatgg ttgcgtatgc    1020
gttgccgagg gagccaatat gccttccacc cttgaggcca ttgatttgtt ccaagaagcg    1080

```
ggcatcttgt ttgcgccagg gaaagcgtct aatgcgggtg gtgtcgcatc ctcagggtta    1140
gagatgacgc aaaatgcaat gcgccttta tggacagatg gggaggtaga cgccaagctt    1200
cactcgatta tgcaagggat tcacgcatca tgtgttaatt atggtacaga aaatggaaaa    1260
gtcaattatg tcaagggagc taatatcgct gggtttgtaa aggtcgccga cgcgatgctt    1320
gcgcagggaa tcgtc                                                     1335
```

<210> SEQ ID NO 4
<211> LENGTH: 445
<212> TYPE: PRT
<213> ORGANISM: Artificial Sequence
<220> FEATURE:
<223> OTHER INFORMATION: Synthesized
<400> SEQUENCE: 4

```
Met Ser Tyr Ser Leu Asp Ser Phe Leu Gln His Ile Lys Gln Arg Asp
1               5                   10                  15

Pro Glu Gln Pro Glu Phe His Gln Ala Val Glu Val Leu Arg Thr
            20                  25                  30

Leu Trp Pro Phe Leu Gln Glu Asn Pro Lys Tyr Val Gln Asn Gly Ile
        35                  40                  45

Ile Glu Arg Met Val Glu Pro Glu Arg Val Ile Leu Phe Arg Val Pro
    50                  55                  60

Trp Val Asp Asp Ala Gly Arg Val His Val Asn Arg Gly Tyr Arg Ile
65                  70                  75                  80

Gln Met Ser Ser Ala Ile Gly Pro Tyr Lys Gly Gly Ile Arg Phe His
                85                  90                  95

Pro Ser Val Asn Leu Gly Val Leu Lys Phe Leu Ala Phe Glu Gln Val
            100                 105                 110

Phe Lys Asn Ser Leu Thr Ser Leu Pro Met Gly Gly Gly Lys Gly Gly
        115                 120                 125

Ala Asp Phe Asp Pro Lys Gly Lys Ser Glu Gln Glu Val Met Arg Phe
    130                 135                 140

Cys Gln Ser Phe Met Asn Glu Leu Tyr Arg His Ile Gly Gln His Leu
145                 150                 155                 160

Asp Val Pro Ala Gly Asp Ile Gly Val Gly Ala Arg Glu Val Gly Tyr
                165                 170                 175

Met Phe Gly Gln Tyr Lys Arg Leu Ala Asn Glu Phe Thr Ser Val Phe
            180                 185                 190

Thr Gly Lys Gly Met Thr Tyr Gly Gly Ser Leu Ile Arg Pro Glu Ala
        195                 200                 205

Thr Gly Tyr Gly Cys Val Tyr Phe Ala Glu Gln Met Leu Lys Ser Ile
    210                 215                 220

Lys Arg Arg Phe Glu Gly Gln Arg Val Ala Ile Ser Gly Ser Gly Asn
225                 230                 235                 240

Val Ala Gln Tyr Ala Ala Gln Lys Val Thr Glu Leu Gly Gly Lys Val
                245                 250                 255

Val Ser Leu Ser Asp Ser Gly Gly Thr Leu Tyr Met Pro Glu Gly Leu
            260                 265                 270

Asn Gly Glu His Trp Ala Tyr Leu Met Asp Leu Lys Thr Val Arg Arg
        275                 280                 285

Gly Arg Ile Glu Glu Met Ala Arg Glu Phe Gly Ala Gln Phe Phe Pro
    290                 295                 300
```

```
Gly Gln Arg Pro Trp His Leu Glu Cys Asp Ile Ala Met Pro Cys Ala
305                 310                 315                 320

Thr Gln Asn Glu Leu Asn Gly Asp Asp Ala Arg Gln Leu Ile Lys Asn
            325                 330                 335

Gly Cys Val Cys Val Ala Glu Gly Ala Asn Met Pro Ser Thr Leu Glu
        340                 345                 350

Ala Ile Asp Leu Phe Gln Glu Ala Gly Ile Leu Phe Ala Pro Gly Lys
    355                 360                 365

Ala Ser Asn Ala Gly Gly Val Ala Ser Ser Gly Leu Glu Met Thr Gln
370                 375                 380

Asn Ala Met Arg Leu Leu Trp Thr Asp Gly Glu Val Asp Ala Lys Leu
385                 390                 395                 400

His Ser Ile Met Gln Gly Ile His Ala Ser Cys Val Asn Tyr Gly Thr
                405                 410                 415

Glu Asn Gly Lys Val Asn Tyr Val Lys Gly Ala Asn Ile Ala Gly Phe
            420                 425                 430

Val Lys Val Ala Asp Ala Met Leu Ala Gln Gly Ile Val
        435                 440                 445

<210> SEQ ID NO 5
<211> LENGTH: 20
<212> TYPE: DNA
<213> ORGANISM: Artificial Sequence
<220> FEATURE:
<223> OTHER INFORMATION: Synthesized

<400> SEQUENCE: 5
taatacgact cactataggg                                              20

<210> SEQ ID NO 6
<211> LENGTH: 20
<212> TYPE: DNA
<213> ORGANISM: Artificial Sequence
<220> FEATURE:
<223> OTHER INFORMATION: Synthesized

<400> SEQUENCE: 6
tgctagttat tgctcagcgg                                              20

<210> SEQ ID NO 7
<211> LENGTH: 490
<212> TYPE: PRT
<213> ORGANISM: Parageobacillus

<400> SEQUENCE: 7

Met Gly Met Ala Asp Thr Lys Lys Leu Thr Thr Ser Trp Gly Ala Pro
1               5                   10                  15

Val Gly Asp Asn Gln Asn Ser Ile Thr Ala Gly Asn Pro Gly Pro Thr
            20                  25                  30

Leu Ile Gln Asp Val His Leu Ile Glu Lys Leu Ala His Phe Asn Arg
        35                  40                  45

Glu Arg Val Pro Glu Arg Val Val His Ala Lys Gly Ala Gly Ala His
    50                  55                  60

Gly Tyr Phe Glu Val Thr Asn Asp Met Ser Lys Tyr Thr Lys Ala Lys
65                  70                  75                  80

Val Phe Asn Gly Val Gly Lys Arg Thr Pro Val Phe Val Arg Phe Ser
                85                  90                  95
```

Thr Val Ala Gly Glu Leu Gly Ser Ala Asp Thr Val Arg Asp Pro Arg
            100                 105                 110

Gly Phe Ala Val Lys Phe Tyr Thr Glu Gly Asn Tyr Asp Ile Val
            115                 120                 125

Gly Asn Asn Thr Pro Ile Phe Phe Ile Arg Asp Ala Ile Lys Phe Pro
130                 135                 140

Asp Phe Ile His Thr Gln Lys Arg Asp Pro Arg Thr His Leu Lys Asn
145                 150                 155                 160

Pro Thr Ala Met Trp Asp Phe Trp Ser Leu Ser Pro Glu Ser Leu His
                165                 170                 175

Gln Val Thr Tyr Leu Phe Gly Asp Arg Gly Ile Pro Leu Thr Tyr Arg
            180                 185                 190

His Met Asn Gly Tyr Gly Ser His Thr Phe Lys Trp Val Asn Glu Lys
            195                 200                 205

Gly Glu Ala Val Trp Val Lys Tyr His Phe Lys Thr Asn Gln Gly Val
210                 215                 220

Lys Asn Met Asp Pro Glu Leu Ala Val Lys Ile Ala Gly Glu Asn Pro
225                 230                 235                 240

Asp Tyr His Thr Glu Asp Leu Tyr Asn Ala Ile Glu Lys Gly Asp Tyr
                245                 250                 255

Pro Ser Trp Thr Leu Tyr Val Gln Ile Met Pro Leu Glu Asp Ala Lys
            260                 265                 270

Thr Tyr Arg Phe Asn Pro Phe Asp Val Thr Lys Val Trp Ser His Lys
            275                 280                 285

Asp Tyr Pro Leu Ile Glu Val Gly Arg Met Val Leu Asn Arg Asn Pro
290                 295                 300

Glu Asn Tyr Phe Ala Glu Val Glu Gln Ala Thr Phe Ser Pro Gly Asn
305                 310                 315                 320

Leu Val Pro Gly Val Glu Pro Ser Pro Asp Lys Met Leu Gln Ala Arg
                325                 330                 335

Leu Phe Ala Tyr Ala Asp Ala His Arg Tyr Arg Val Gly Val Asn His
            340                 345                 350

Asn Leu Leu Pro Ile Asn Arg Pro Arg Val Glu Val Asn Asn Tyr Gln
            355                 360                 365

Arg Asp Gly Phe Met Arg Phe Asp Asn Gly Gly Gly Ser Val Asn
370                 375                 380

Tyr Glu Pro Asn Ser Phe Gly Pro Thr Glu Val Ser Glu His Lys
385                 390                 395                 400

Thr Thr Pro Phe Pro Val Ser Gly Met Ala Glu Ser Val Pro Tyr Asp
                405                 410                 415

Asp Asp Asp His Tyr Thr Gln Ala Gly Asp Leu Tyr Arg Leu Met Ser
            420                 425                 430

Glu Glu Glu Lys Ala Arg Leu Val Lys Asn Ile Val Glu Ser Leu Lys
            435                 440                 445

Gln Val Thr Lys Glu Glu Ile Lys Leu Arg Gln Ile Arg His Phe Tyr
            450                 455                 460

Lys Ala Asp Pro Asp Tyr Gly Arg Arg Val Ala Glu Gly Leu Gly Leu
465                 470                 475                 480

Gln Val Pro Asp Asp Val Ile Thr Asn Ala
                485                 490

<210> SEQ ID NO 8
<211> LENGTH: 1473

```
<212> TYPE: DNA
<213> ORGANISM: Artificial Sequence
<220> FEATURE:
<223> OTHER INFORMATION: Synthesized

<400> SEQUENCE: 8
atgggcatgg cggacaccaa gaaactgacc accagctggg gcgcgccggt gggtgataac      60
cagaacagca ttaccgcggg taacccgggt ccgaccctga tccaagacgt gcacctgatt     120
gagaaactgg cgcacttcaa ccgtgaacgt gttccggaac gtgttgttca tgcgaagggt     180
gcgggtgcgc acggttactt cgaagtgacc aacgatatga gcaaatatac caaggcgaaa     240
gtgtttaacg cgttggcaa gcgtaccccg tgttcgttc gttttagcac cgttgcgggt     300
gaactgggta gcgcggacac cgtgcgtgat ccgcgtggtt tcgcggttaa attttacacc     360
gaggaaggca actatgacat cgttggtaac aacaccccga tcttctttat tcgtgacgcg     420
atcaagttcc cggatttat tcacacccag aaacgtgacc cgcgtaccca cctgaagaac     480
ccgaccgcga tgtgggattt ctggagcctg agcccggaaa gcctgcacca agtgacctac     540
ctgtttggcg accgtggtat cccgctgacc taccgtcaca tgaacggcta tggtagccac     600
accttcaaat gggttaacga aaagggcgag gcggtgtggg ttaagtatca ctttaaaacc     660
aaccagggtg tgaaaaacat ggatccggag ctggcggtta agattgcggg cgaaaacccg     720
gactaccaca ccgaggatct gtataacgcg atcgaaaagg gtgactaccc gagctggacc     780
ctgtatgtgc aaattatgcc gctggaagat gcgaagacct accgtttcaa cccgtttgac     840
gtgaccaaag tttggagcca aaggattat ccgctgatcg aagtgggccg tatggttctg     900
aaccgtaacc cggaaaacta cttcgcggaa gttgagcagg cgacctttag cccgggtaac     960
ctggtgccgg tgttgagcc gagcccggac aaaatgctgc aagcgcgtct gttcgcgtac    1020
gcggatgcgc accgttatcg tgtgggtgtt aaccacaacc tgctgccgat taaccgtccg    1080
cgtgttgagg tgaacaacta ccagcgtgac ggcttcatgc gttttgataa caacggtggc    1140
ggtagcgtga actatgaacc gaacagcttc ggcggtccga ccgaagttag cgagcacaaa    1200
accaccccgt ttccggttag cggtatggcg gaaagcgttc cgtacgacga tgacgatcac    1260
tatacccaag cgggcgaccct gtaccgtctg atgagcgagg aagagaaagc gcgtctggtg    1320
aagaacatcg ttgagagcct gaagcaggtg accaaagaag agatcaagct gcgtcaaatt    1380
cgtcactttt acaaggcgga cccggattat ggtcgtcgtg ttgcggaagg tctgggtctg    1440
caggtgccgg acgatgttat taccaacgcg taa                                 1473
```

```
<210> SEQ ID NO 9
<211> LENGTH: 372
<212> TYPE: PRT
<213> ORGANISM: Rhodotorula taiwanensis

<400> SEQUENCE: 9

Met Ala Pro Ser Lys Arg Val Val Leu Gly Ser Gly Val Gly
1               5                   10                  15

Leu Ser Ser Ala Leu Thr Leu Ala Gln Lys Gly Tyr Ser Val His Val
                20                  25                  30

Val Ala Arg Asp Leu Pro Glu Asp Thr Val Ala Gln Thr Phe Ala Ser
            35                  40                  45

Pro Trp Ala Gly Ala Val Trp Thr Pro Glu Met Thr Lys Glu Asp Gly
        50                  55                  60

Pro Arg Gln Ala Lys Trp Glu Thr Ala Thr Phe Asn Gln Trp Val Asp
65                  70                  75                  80
```

```
Leu Val Pro Gln Gly Leu Ala Met Trp Leu Lys Gly Thr Arg Arg Tyr
                85                  90                  95
Ala Gln Asp Glu Ala Gly Leu Leu Gly His Trp Tyr Gln His Ile Thr
            100                 105                 110
Pro Asn Tyr Arg Lys Leu Glu Ser Ser Glu Cys Pro Pro Gly Ala Ile
        115                 120                 125
Gly Val Thr Tyr Asp Thr Leu Ser Val Asn Ala Pro Lys Phe Cys Gln
    130                 135                 140
Tyr Leu Gln Arg Glu Ala Gln Lys Leu Gly Val Thr Phe Glu Arg Arg
145                 150                 155                 160
Leu Val Thr Ser Leu Glu Gln Ile Glu Gly Gly Phe Asp Leu Ile Val
                165                 170                 175
Asn Ala Thr Gly Leu Gly Ala Lys Ser Ile Ala Gly Val Glu Asp Gln
            180                 185                 190
Glu Val Glu Pro Ile Arg Gly Gln Thr Val Leu Val Lys Ser Ala Cys
        195                 200                 205
Lys Arg Cys Thr Ser Asp Ser Ser Asp Pro Asn Ser Pro Ala Tyr Ile
    210                 215                 220
Ile Pro Arg Pro Gly Gly Glu Val Ile Cys Gly Gly Thr Tyr Leu Val
225                 230                 235                 240
Gly Asn Tyr Asp Leu Ser Val Asp Pro Pro Thr Ile Asn Arg Ile Leu
                245                 250                 255
Gln His Cys Leu Arg Leu Asp Pro Ser Ile Ser Thr Asp Gly Thr Leu
            260                 265                 270
Glu Gly Ile Glu Ile Val Arg His Asn Val Gly Leu Arg Pro Ala Arg
        275                 280                 285
Arg Gly Gly Pro Arg Val Glu Val Arg Val Ala Phe Pro Leu Glu
    290                 295                 300
Arg Gly Lys Ser Lys Leu Ser Leu Gly Thr Ala Arg Ala Asp Ser Ser
305                 310                 315                 320
Lys Pro Arg Arg Glu Val Pro Val Val His Ala Tyr Gly Phe Ser Ser
                325                 330                 335
Ala Gly Tyr Gln Gln Gly Trp Gly Ala Ala Leu Glu Val Ala Glu Leu
            340                 345                 350
Val Glu Gly Ala Ile Gly Ala Ala Pro Ala Arg Ser Ser His Arg Trp
        355                 360                 365
Leu Ser Lys Leu
    370

<210> SEQ ID NO 10
<211> LENGTH: 1116
<212> TYPE: DNA
<213> ORGANISM: Artificial Sequence
<220> FEATURE:
<223> OTHER INFORMATION: Synthesized

<400> SEQUENCE: 10
atggcgccga gcaagcgtgt ggttgtgctg ggtagcggcg ttgttggtct gagcagcgcg      60
ctgaccctgg cgcagaaagg ctacagcgtt cacgttgtgg cgcgtgacct gccggaagat     120
accgttgcgc aaacctttgc gagcccgtgg gcgggtgcgg tttggacccc ggaaatgacc     180
aaggaagacg tccgcgtcag gcgaaatgg gagaccgcga cctttaacca gtgggttgat     240
ctggtgccgc aaggtctggc gatgtggctg aagggcaccc gtcgttatgc gcaagatgag     300
gcgggtctgc tgggtcactg gtaccaacac atcaccccga actatcgtaa actggagagc     360
```

```
agcgaatgcc cgccgggtgc gattggtgtt acctacgata ccctgagcgt gaacgcgccg    420
aagttctgcc agtatctgca acgtgaagcg cagaaactgg gtgttacctt tgagcgtcgt    480
ctggtgacca gcctggagca atcgaaggt ggcttcgacc tgattgttaa cgcgaccggt     540
ctgggtgcga gagcattgc gggtgttgaa gaccaggaag tggaaccgat cgtggccaa      600
accgttctgg tgaagagcgc ttgcaaacgt tgcacctctg acagcagcga tccgaacagc    660
ccggcgtaca tcattccgcg tccgggtggc gaggtgatct gcggtggcac ctacctggtt    720
ggtaactatg acctgagcgt ggatccgccg accatcaacc gtattctgca gcactgcctg    780
cgtctggacc cgagcattag caccgatggt accctgaggg catcgaaat tgttcgtcat     840
aacgttggcc tgcgtccggc gcgtcgtggt ggcccgcgtg ttgaggtgga acgtgttgcg    900
tttccgctgg aacgtggcaa gagcaaactg agcctgggta ccgcgcgtgc ggatagcagc    960
aaaccgcgtc gtgaggtgcc ggttgtgcac gcgtacggtt tcagcagcgc gggttatcaa   1020
cagggttggg gcgcggcgct ggaagtggcg gaactggtgg agggtgcgat tggtgcggcg   1080
ccggcgcgta gcagccaccg ttggctgagc aaactg                              1116
```

<210> SEQ ID NO 11
<211> LENGTH: 262
<212> TYPE: PRT
<213> ORGANISM: Exiguobacterium sibiricum

<400> SEQUENCE: 11

```
Met Gly Tyr Asn Ser Leu Lys Gly Lys Val Ala Ile Val Thr Gly Gly
1               5                   10                  15

Ser Met Gly Ile Gly Glu Ala Ile Ile Arg Arg Tyr Ala Glu Glu Gly
            20                  25                  30

Met Arg Val Val Ile Asn Tyr Arg Ser His Pro Glu Glu Ala Lys Lys
        35                  40                  45

Ile Ala Glu Asp Ile Lys Gln Ala Gly Gly Glu Ala Leu Thr Val Gln
    50                  55                  60

Gly Asp Val Ser Lys Glu Glu Asp Met Ile Asn Leu Val Lys Gln Thr
65                  70                  75                  80

Val Asp His Phe Gly Gln Leu Asp Val Phe Val Asn Asn Ala Gly Val
                85                  90                  95

Glu Met Pro Ser Pro Ser His Glu Met Ser Leu Glu Asp Trp Gln Lys
            100                 105                 110

Val Ile Asp Val Asn Leu Thr Gly Ala Phe Leu Gly Ala Arg Glu Ala
        115                 120                 125

Leu Lys Tyr Phe Val Glu His Asn Val Lys Gly Asn Ile Ile Asn Met
    130                 135                 140

Ser Ser Val His Glu Ile Ile Pro Trp Pro Thr Phe Val His Tyr Ala
145                 150                 155                 160

Ala Ser Lys Gly Gly Val Lys Leu Met Thr Gln Thr Leu Ala Met Glu
                165                 170                 175

Tyr Ala Pro Lys Gly Ile Arg Ile Asn Ala Ile Gly Pro Gly Ala Ile
            180                 185                 190

Asn Thr Pro Ile Asn Ala Glu Lys Phe Glu Asp Pro Lys Gln Arg Ala
        195                 200                 205

Asp Val Glu Ser Met Ile Pro Met Gly Asn Ile Gly Lys Pro Glu Glu
    210                 215                 220

Ile Ser Ala Val Ala Ala Trp Leu Ala Ser Asp Glu Ala Ser Tyr Val
225                 230                 235                 240
```

Thr Gly Ile Thr Leu Phe Ala Asp Gly Gly Met Thr Leu Tyr Pro Ser
            245                 250                 255

Phe Gln Ala Gly Arg Gly
            260

<210> SEQ ID NO 12
<211> LENGTH: 789
<212> TYPE: DNA
<213> ORGANISM: Artificial Sequence
<220> FEATURE:
<223> OTHER INFORMATION: Synthesized

<400> SEQUENCE: 12

```
atgggttata attctctgaa aggcaaagtc gcgattgtta ctggtggtag catgggcatt    60
ggcgaagcga tcatccgtcg ctatgcagaa gaaggcatgc gcgttgttat caactatcgt   120
agccatccgg aggaagccaa aaagatcgcc gaagatatta acaggcagg tggtgaagcc   180
ctgaccgtcc agggtgacgt ttctaaagag gaagacatga tcaacctggt gaaacagact   240
gttgatcact tcggtcagct ggacgtcttt gtgaacaacg ctggcgttga gatgccttct   300
ccgtcccacg aaatgtccct ggaagactgg cagaaagtga tcgatgttaa tctgacgggt   360
gcgttcctgg gcgctcgtga agctctgaaa tacttcgttg aacataacgt gaaaggcaac   420
attatcaata tgtctagcgt ccacgaaatc atcccgtggc ctactttcgt acattacgct   480
gcttctaagg gtggcgttaa actgatgacc cagactctgg ctatggaata tgcaccgaaa   540
ggtatccgca ttaacgctat cggtccaggc gcgatcaaca ctccaattaa tgcagaaaaa   600
ttcgaggatc cgaaacagcg tgcagacgtg gaaagcatga tcccgatggg caacatcggc   660
aagccagagg agatttccgc tgtcgcggca tggctggctt ctgacgaagc gtcttacgtt   720
accggcatca ccctgttcgc agatggtggc atgaccctgt accgagcttt tcaggctggc   780
cgtggttga                                                          789
```

<210> SEQ ID NO 13
<211> LENGTH: 398
<212> TYPE: PRT
<213> ORGANISM: Lactobacillus buchneri

<400> SEQUENCE: 13

Met Thr Lys Val Leu Ala Val Leu Tyr Pro Asp Pro Val Asp Gly Phe
1               5                   10                  15

Pro Pro Lys Tyr Val Arg Asp Asp Ile Pro Lys Ile Thr His Tyr Pro
            20                  25                  30

Asp Gly Ser Thr Val Pro Thr Pro Glu Gly Ile Asp Phe Lys Pro Gly
        35                  40                  45

Glu Leu Leu Gly Ser Val Ser Gly Gly Leu Gly Leu Lys Lys Tyr Leu
    50                  55                  60

Glu Ser Lys Gly Val Glu Phe Val Val Thr Ser Asp Lys Glu Gly Pro
65                  70                  75                  80

Asp Ser Val Phe Glu Lys Glu Leu Pro Thr Ala Asp Val Val Ile Ser
            85                  90                  95

Gln Pro Phe Trp Pro Ala Tyr Leu Thr Ala Asp Leu Ile Asp Lys Ala
            100                 105                 110

Lys Lys Leu Lys Leu Ala Ile Thr Ala Gly Ile Gly Ser Asp His Val
        115                 120                 125

Asp Leu Asn Ala Ala Asn Glu His Asn Ile Thr Val Ala Glu Val Thr
    130                 135                 140

Tyr Ser Asn Ser Val Ser Val Ala Glu Ala Glu Val Met Gln Leu Leu
145                 150                 155                 160

Ala Leu Val Arg Asn Phe Ile Pro Ala His Asp Ile Val Lys Ala Gly
                165                 170                 175

Gly Trp Asn Ile Ala Asp Ala Val Ser Arg Ala Tyr Asp Leu Glu Gly
            180                 185                 190

Met Thr Val Gly Val Ile Gly Ala Gly Arg Ile Gly Arg Ala Val Leu
        195                 200                 205

Glu Arg Leu Lys Pro Phe Gly Val Lys Leu Val Tyr Asn Gln Arg His
210                 215                 220

Gln Leu Pro Asp Glu Val Glu Asn Glu Leu Gly Leu Thr Tyr Phe Pro
225                 230                 235                 240

Asp Val His Glu Met Val Lys Val Val Asp Ala Val Leu Ala Ala
                245                 250                 255

Pro Leu His Ala Gln Thr Tyr His Leu Phe Asn Asp Glu Val Leu Ala
            260                 265                 270

Thr Met Lys Arg Gly Ala Tyr Ile Val Asn Asn Ser Arg Gly Glu Glu
        275                 280                 285

Val Asp Arg Asp Ala Ile Val Arg Ala Leu Asn Ser Gly Gln Ile Gly
290                 295                 300

Gly Tyr Ser Gly Asp Val Trp Tyr Pro Gln Pro Ala Pro Lys Asp His
305                 310                 315                 320

Pro Trp Arg Thr Met Pro Asn Glu Ala Met Thr Pro His Met Ser Gly
                325                 330                 335

Thr Thr Leu Ser Ala Gln Ala Arg Tyr Ala Ala Gly Ala Arg Glu Ile
            340                 345                 350

Leu Glu Asp Phe Leu Glu Asp Lys Pro Ile Arg Pro Glu Tyr Leu Ile
        355                 360                 365

Ala Gln Gly Gly Ser Leu Ala Gly Thr Gly Ala Lys Ser Tyr Thr Val
370                 375                 380

Lys Lys Gly Glu Glu Thr Pro Gly Ser Gly Glu Ala Glu Lys
385                 390                 395

<210> SEQ ID NO 14
<211> LENGTH: 1197
<212> TYPE: DNA
<213> ORGANISM: Artificial Sequence
<220> FEATURE:
<223> OTHER INFORMATION: Synthesized

<400> SEQUENCE: 14

```
atgaccaaag ttctggccgt gctgtatccg gatccggtgg atggttttcc gccgaaatat      60
gttcgtgatg atattccgaa aatcacccat tatccggatg cagtaccgtt ccgaccccg     120
gaaggcattg attttaaacc gggtgaactg ctgggtagcg ttagtggcgg tctgggcctg     180
aaaaaatatc tggaaagtaa aggtgtggaa tttgttgtta ccagtgataa agaaggcccg     240
gatagtgtgt ttgaaaaaga actgccgacc gccgatgtgg ttattagtca gccgttttgg     300
ccggcctatc tgaccgcaga tctgattgat aaagcaaaaa agctgaaact ggcaattacc     360
gccggtattg cagcgatca tgtggatctg aatgccgcca tgaacataa tattaccgtt     420
gcagaagtga cctatagcaa tagtgttagt gttgcagaag cagaagtgat gcagctgctg     480
gccctggtgc gtaattttat tccggcacat gatattgtga agccggtgg ctggaatatt     540
gcagatgcag ttagccgtgc ctatgatctg gaaggtatga ccgttggtgt gattggtgca     600
```

-continued

```
ggccgcattg gtcgtgccgt tctggaacgt ctgaaaccgt ttggcgttaa actggtgtat    660
aatcagcgcc atcagctgcc ggatgaagtt gaaaatgaac tgggcctgac ctattttccg    720
gatgttcatg aaatggtgaa agttgtggat gccgttgttc tggcagcacc gctgcatgca    780
cagacctatc atctgtttaa tgatgaagtt ctggccacca tgaaacgtgg cgcctatatt    840
gtgaataata gccgcggcga agaagttgat cgcgatgcaa ttgttcgcgc actgaatagc    900
ggtcagattg gcggttatag tggcgatgtt tggtatccgc agccggcacc gaaagatcat    960
ccgtggcgta ccatgccgaa tgaagcaatg accccgcata tgagtggcac caccctgagt   1020
gcccaggcac gctatgccgc aggtgcacgt gaaattctgg aagatttttct ggaagataaa   1080 ccgattcgtc cggaatatct gattgcccag ggtggtagtc tggccggtac cggtgccaaa   1140
agttataccg tgaaaaaagg cgaagaaacc ccgggtagcg gcgaagcaga aaaataa      1197
```

<210> SEQ ID NO 15
<211> LENGTH: 252
<212> TYPE: PRT
<213> ORGANISM: Lactobacillus brevis

<400> SEQUENCE: 15

```
Met Ser Asn Arg Leu Asp Gly Lys Val Ala Ile Ile Thr Gly Gly Thr
1               5                   10                  15

Leu Gly Ile Gly Leu Ala Ile Ala Thr Lys Phe Val Glu Glu Gly Ala
            20                  25                  30

Lys Val Met Ile Thr Gly Arg His Ser Asp Val Gly Glu Lys Ala Ala
        35                  40                  45

Lys Ser Val Gly Thr Pro Asp Gln Ile Gln Phe Gln His Asp Ser
    50                  55                  60

Ser Asp Glu Asp Gly Trp Thr Lys Leu Phe Asp Ala Thr Glu Lys Ala
65                  70                  75                  80

Phe Gly Pro Val Ser Thr Leu Val Asn Asn Ala Gly Ile Ala Val Asn
                85                  90                  95

Lys Ser Val Glu Glu Thr Thr Thr Ala Glu Trp Arg Lys Leu Leu Ala
            100                 105                 110

Val Asn Leu Asp Gly Val Phe Phe Gly Thr Arg Leu Gly Ile Gln Arg
        115                 120                 125

Met Lys Asn Lys Gly Leu Gly Ala Ser Ile Ile Asn Met Ser Ser Ile
    130                 135                 140

Glu Gly Phe Val Gly Asp Pro Ser Leu Gly Ala Tyr Asn Ala Ser Lys
145                 150                 155                 160

Gly Ala Val Arg Ile Met Ser Lys Ser Ala Ala Leu Asp Cys Ala Leu
                165                 170                 175

Lys Asp Tyr Asp Val Arg Val Asn Thr Val His Pro Gly Tyr Ile Lys
            180                 185                 190

Thr Pro Leu Val Asp Asp Leu Pro Gly Ala Glu Glu Ala Met Ser Gln
        195                 200                 205

Arg Thr Lys Thr Pro Met Gly His Ile Gly Glu Pro Asn Asp Ile Ala
    210                 215                 220

Tyr Ile Cys Val Tyr Leu Ala Ser Asn Glu Ser Lys Phe Ala Thr Gly
225                 230                 235                 240

Ser Glu Phe Val Val Asp Gly Gly Tyr Thr Ala Gln
                245                 250
```

<210> SEQ ID NO 16
<211> LENGTH: 759

<210> SEQ ID NO 16 (continued)
<212> TYPE: DNA
<213> ORGANISM: Artificial Sequence
<220> FEATURE:
<223> OTHER INFORMATION: Synthesized

<400> SEQUENCE: 16

```
atgagcaacc gtctggacgg caaggtggcg atcattaccg gtggcaccct gggtattggt      60
ctggcgattg cgaccaagtt cgtggaggaa ggtgcgaaag ttatgatcac cggccgtcac     120
agcgacgtgg gcgagaaggc ggcgaaaagc gttggcaccc cggaccagat tcaattcttt     180
cagcacgata gcagcgacga ggatggttgg accaagctgt tcgatgcgac cgaaaaagcg     240
tttggcccgg ttagcaccct ggttaacaac gcgggtattg cggtgaacaa gagcgttgag     300
gaaaccacca ccgcggagtg gcgtaaactg ctggcggtga acctggatgg tgttttcttt     360
ggcacccgtc tgggtatcca acgtatgaag aacaaaggtc tgggcgcgag catcattaac     420
atgagcagca ttgaaggttt cgttggtgac ccgagcctgg gtgcgtacaa cgcgagcaag     480
ggtgcggttc gtatcatgag caaaagcgcg gcgctggatt gcgcgctgaa ggactacgat     540
gtgcgtgtta acaccgtgca cccgggctat attaaaaccc cgctggttga cgatctgccg     600
ggtgcggagg aagcgatgag ccagcgtacc aagaccccga tgggtcacat cggcgaaccg     660
aacgacatcg cgtacatttg cgtttatctg gcgagcaacg agagcaaatt cgcgaccggt     720
agcgaatttg tggttgatgg tggctatacc gcgcaataa                            759
```

<210> SEQ ID NO 17
<211> LENGTH: 39
<212> TYPE: DNA
<213> ORGANISM: Artificial Sequence
<220> FEATURE:
<223> OTHER INFORMATION: Synthesized

<400> SEQUENCE: 17

```
actttaataa ggagatatac catggatgca tagccagaa                            39
```

<210> SEQ ID NO 18
<211> LENGTH: 36
<212> TYPE: DNA
<213> ORGANISM: Artificial Sequence
<220> FEATURE:
<223> OTHER INFORMATION: Synthesized

<400> SEQUENCE: 18

```
actgcggccg caagcttagt ggtggtggtg gtggtg                               36
```

<210> SEQ ID NO 19
<211> LENGTH: 36
<212> TYPE: DNA
<213> ORGANISM: Artificial Sequence
<220> FEATURE:
<223> OTHER INFORMATION: Synthesized

<400> SEQUENCE: 19

```
taagaaggag atataatggc ggacaccaag aaactg                               36
```

<210> SEQ ID NO 20
<211> LENGTH: 39
<212> TYPE: DNA
<213> ORGANISM: Artificial Sequence
<220> FEATURE:
<223> OTHER INFORMATION: Synthesized

<400> SEQUENCE: 20
ggtttcttta ccagattacg cgttggtaat aacatcgtc                              39

<210> SEQ ID NO 21
<211> LENGTH: 33
<212> TYPE: DNA
<213> ORGANISM: Artificial Sequence
<220> FEATURE:
<223> OTHER INFORMATION: Synthesized

<400> SEQUENCE: 21
ttatactacc agcgtaatgc tttaccaaaa gaa                                    33

<210> SEQ ID NO 22
<211> LENGTH: 33
<212> TYPE: DNA
<213> ORGANISM: Artificial Sequence
<220> FEATURE:
<223> OTHER INFORMATION: Synthesized

<400> SEQUENCE: 22
ttcttttggt aaagcattac gctggtagta taa                                    33

<210> SEQ ID NO 23
<211> LENGTH: 40
<212> TYPE: DNA
<213> ORGANISM: Artificial Sequence
<220> FEATURE:
<223> OTHER INFORMATION: Synthesized

<400> SEQUENCE: 23
taagaaggag atatacatat gaccaaagtt ctggccgtgc                             40

<210> SEQ ID NO 24
<211> LENGTH: 41
<212> TYPE: DNA
<213> ORGANISM: Artificial Sequence
<220> FEATURE:
<223> OTHER INFORMATION: Synthesized

<400> SEQUENCE: 24
ggtttcttta ccagactcga gttattttc tgcttcgccg c                            41

<210> SEQ ID NO 25
<211> LENGTH: 41
<212> TYPE: DNA
<213> ORGANISM: Artificial Sequence
<220> FEATURE:
<223> OTHER INFORMATION: Synthesized

<400> SEQUENCE: 25
taagaaggag atatacatat gatgagcaac cgtctggacg g                           41

<210> SEQ ID NO 26
<211> LENGTH: 42
<212> TYPE: DNA
<213> ORGANISM: Artificial Sequence
<220> FEATURE:
<223> OTHER INFORMATION: Synthesized

<400> SEQUENCE: 26
tttaccagac tcgagggtac cttattgcgc ggtatagcca cc                          42

<210> SEQ ID NO 27

```
<211> LENGTH: 39
<212> TYPE: DNA
<213> ORGANISM: Artificial Sequence
<220> FEATURE:
<223> OTHER INFORMATION: Synthesized

<400> SEQUENCE: 27
aaggagatat accatgggca tgcatagcca gaaacgtgt                              39

<210> SEQ ID NO 28
<211> LENGTH: 39
<212> TYPE: DNA
<213> ORGANISM: Artificial Sequence
<220> FEATURE:
<223> OTHER INFORMATION: Synthesized

<400> SEQUENCE: 28
gtttctttac cagactcgag ttacgcgttg gtaataaca                              39

<210> SEQ ID NO 29
<211> LENGTH: 39
<212> TYPE: DNA
<213> ORGANISM: Artificial Sequence
<220> FEATURE:
<223> OTHER INFORMATION: Synthesized

<400> SEQUENCE: 29
aaggagatat accatgggca tgattgagag cgtcgagtc                              39

<210> SEQ ID NO 30
<211> LENGTH: 39
<212> TYPE: DNA
<213> ORGANISM: Artificial Sequence
<220> FEATURE:
<223> OTHER INFORMATION: Synthesized

<400> SEQUENCE: 30
gtttctttac cagactcgag ttattttct gcttcgccg                               39
```

METHOD FOR PREPARING L-GLUFOSINATE AMMONIUM BY BIOLOGICAL ENZYMATIC DE-RACEMIZATION, GLUFOSINATE AMMONIUM DEHYDROGENASE MUTANT AND USE THEREOF

This is a U.S. national stage application of PCT Application No. PCT/CN2020/139768 under 35 U.S.C. 371, filed Dec. 26, 2020 in Chinese, claiming priority of Chinese Application No. 202010191945.1, filed Mar. 18, 2020, all of which are hereby incorporated by reference.

TECHNICAL FIELD

The present invention relates to the field of biotechnology, in particular to a method for preparing L-glufosinate ammonium by biological enzymatic de-racemization, a glufosinate ammonium dehydrogenase mutant and a use thereof.

BACKGROUND TECHNOLOGY

Glufosinate ammonium, also known as phosphinothricin (PPT for short), with a chemical name of 2-amino-4-[hydroxy(methyl)phosphonyl]butanoic acid, is the world's second major herbicide to which genetically modified crops are tolerant. It was developed and produced by the Hearst Corporation (now owned by the Bayer company after several mergers). Glufosinate ammonium, belonging to phosphonic acid herbicides, is a glutamine synthase inhibitor and a non-selective (sterilant) contact-killing herbicide.

It is well known that the market for sterilant herbicides is huge. At present, the three major herbicides in the world are respectively paraquat, glyphosate, and glufosinate ammonium. In terms of use in the market, glyphosate is most widely used, but due to its long-term use, a large number of weeds become resistant, and the glyphosate tends to be ineffective. Paraquat has been included in the "Rotterdam Convention" due to its high toxicity, more and more countries around the world have banned or restricted its use, and the Ministry of Agriculture of China has issued an announcement stating that the production of paraquat was stopped on Jul. 1, 2014, and the use of paraquat was banned on Jul. 1, 2016. However, although the current output of glufosinate ammonium is small, it has excellent herbicidal performance and less phytotoxic side effects, such that it has huge market potential for some time to come.

Glufosinate ammonium includes two optical isomers, which are respectively L-glufosinate ammonium and D-glufosinate ammonium. But only the L-glufosinate ammonium has herbicidal activity, and is easy to decompose in the soil, less toxic to humans and animals, broad in herbicidal spectrum and less destructive to the environment.

At present, glufosinate ammonium sold on the market is generally a racemic mixture. If glufosinate ammonium products can be used in the form of pure optical isomers of L-configuration, the usage amount of glufosinate ammonium can be significantly reduced, which is of great significance for improving the atom economy, reducing the usage cost and reducing the environmental pressure.

There are three main preparation methods of chiral pure L-glufosinate ammonium: chiral resolution, chemical synthesis and biocatalysis.

Chiral resolution involves chirally resolving racemic D,L-glufosinate ammonium or its derivatives to separate D-type and L-type isomers, thereby obtaining optically pure L-glufosinate ammonium. This technology mainly has the following disadvantages: an expensive chiral resolution reagent needs to be used, the theoretical yield can only reach 50%, the single resolution rate is low, and the technology is relatively complicated.

Chemical synthesis involves synthesizing optically pure L-glufosinate ammonium from chiral raw materials. Chemical asymmetric synthesis has many process steps and low yield, and expensive chiral raw materials lead to high production cost, which is not conducive to large-scale preparation of L-glufosinate ammonium.

Biocatalysis for producing glufosinate ammonium has the advantages of strict stereoselectivity, mild reaction conditions, high yield, etc., and is an advantageous method for producing L-glufosinate ammonium. Biocatalysis mainly includes the following two types:

(1) L-glufosinate ammonium is obtained by direct enzymatic hydrolysis with derivatives of L-glufosinate ammonium as substrates. The main advantages include high conversion rate and higher ee value of products, but expensive and difficultly available chiral raw materials are needed as precursors.

(2) L-glufosinate ammonium is obtained by selective resolution of enzyme with a precursor of racemic glufosinate ammonium as a substrate. The main advantages are that raw materials are relatively easy to obtain and the activity of a catalyst is high, but the theoretical yield can only reach 50%, resulting in waste of raw materials.

In addition to the two conventional biocatalysis methods, de-racemization synthesis using D,L-glufosinate ammonium as a raw material highlights a huge cost advantage. Because commercially available glufosinate ammonium is D,L-glufosinate ammonium, its industrial production technology is very mature. De-racemization synthesis directly uses D,L-glufosinate ammonium as a raw material, which is simple and easy to obtain and lower in cost, and better connects with an existing industrial production system for glufosinate ammonium.

SUMMARY OF INVENTION

In view of the deficiencies in the prior art, the present invention provides a glufosinate ammonium dehydrogenase mutant, which has higher catalytic activity, and is used in a method for preparing L-glufosinate ammonium by biological enzymatic de-racemization.

Provided is a method for preparing L-glufosinate ammonium by biological enzymatic de-racemization, comprising catalyzing D,L-glufosinate ammonium as a raw material by a multi-enzyme catalysis system to obtain L-glufosinate ammonium, where the enzyme catalysis system comprises D-amino acid oxidase for catalyzing D-glufosinate ammonium in the D,L-glufosinate ammonium to 2-carbonyl-4-[hydroxy(methyl)phosphonyl]butanoic acid, and a glufosinate ammonium dehydrogenase mutant for catalytically reducing 2-carbonyl-4-[hydroxy(methyl)phosphonyl]butanoic acid to L-glufosinate ammonium, and the glufosinate ammonium dehydrogenase mutant is obtained by mutation of glufosinate-ammonium dehydrogenase in wild fungi *Thiopseudomonas denitrificans* at a mutation site of V377S. The glufosinate ammonium dehydrogenase mutant has an amino acid sequence as shown in SEQ ID No.4 and a gene sequence as shown in SEQ ID No.3.

Preferably, an amino acid sequence of the D-amino acid oxidase is shown in SEQ ID No.9. A gene sequence of the D-amino acid oxidase is as shown in SEQ ID No.10.

The enzyme catalysis system further includes catalase for removing a byproduct, namely, hydrogen peroxide. The accumulation of the byproduct, namely, the hydrogen peroxide will cause a toxic effect on a biocatalyst. The catalase is derived from *Parageobacillus,* and has an amino acid sequence as shown in SEQ ID No.7 and a gene sequence as shown in SEQ ID No.8.

The enzyme catalysis system further comprises a coenzyme cycling system, and the coenzyme cycling system is at least one of the following:

(1) a formate dehydrogenase coenzyme cycling system including formate dehydrogenase, formate and coenzyme;

(2) a glucose dehydrogenase coenzyme cycling system including glucose dehydrogenase, glucose and coenzyme; and (3) an alcohol dehydrogenase coenzyme cycling system including alcohol dehydrogenase, isopropanol and coenzyme.

Coenzymes used in the above-mentioned dehydrogenase coenzyme cycling systems are cyclically regenerated between reduced form of nicotinamide adenine dinucleotide phosphate (NADPH) and nicotinamide adenine dinucleotide phosphate (NADP), or cyclically regenerated between reduced form of nicotinamide adenine dinucleotid (NADH) and nicotinamide adenine dinucleotid (NAD). Since the coenzymes are cyclically regenerated during the reaction, one or both of NADPH/NADH or NADP/NAD can be added at the initial addition.

The formate dehydrogenase is derived from *Lactobacillus buchneri,* and has an amino acid sequence as shown in SEQ ID No.13; the glucose dehydrogenase is derived from *Exiguobacterium sibiricum,* and has an amino acid sequence as shown in SEQ ID No.11; and the alcohol dehydrogenase is derived from *Lactobacillus brevis,* and has an amino acid sequence as shown in SEQ ID No.15.

According to the method for preparing L-glufosinate ammonium by biological enzymatic de-racemization in the present invention, when various enzymes are added to a reaction system, crude enzymes expressed by recombinant bacteria can be used, purified enzymes can also be used, or the recombinant bacteria expressing various enzymes can be directly added to the reaction system to express various enzymes. Each enzyme can be expressed by various types of recombinant bacteria capable of expressing a type of enzyme alone, or genes of various enzymes can be cloned into the same type of recombinant bacteria. A type of recombinant bacteria capable of expressing various enzymes are used.

The present invention further provides a glufosinate ammonium dehydrogenase mutant obtained by mutation of glufosinate-ammonium dehydrogenase in wild fungi *Thiopseudomonas denitrificans* at a mutation site of V377S.

The present invention further provides a gene for coding the glufosinate ammonium dehydrogenase mutant, where a nucleotide sequence is as shown in SEQ ID No.3.

The present invention further provides recombinant bacteria containing the gene.

The present invention further provides a use of the glufosinate ammonium dehydrogenase mutant, the gene or the recombinant bacteria in the preparation of L-glufosinate ammonium.

Compared with the prior art, the present invention has the following beneficial effects:

(1) The glufosinate ammonium dehydrogenase mutant in the present invention has better catalytic efficiency. When racemic D,L-glufosinate ammonium is used as a substrate for a catalytic reaction, the conversion rate is much higher than the conversion rate of a wild-type enzyme, and the yield of 2-carbonyl-4-[hydroxy(methyl)phosphonyl]butanoic acid (PPO for short) is also greatly improved.

(2) According to the present invention, the racemic D,L-glufosinate ammonium is used as the substrate, the D-glufosinate ammonium is oxidized to the 2-carbonyl-4-[hydroxy(methyl)phosphonyl]butanoic acid by using the D-amino acid oxidase, a hydrogen peroxide removal system, the glufosinate ammonium dehydrogenase mutant and the coenzyme cycling system, and the L-glufosinate ammonium is completely retained because it does not participate in the reaction; and the product 2-carbonyl-4-[hydroxy(methyl)phosphonyl]butanoic acid can be further catalytically reduced to the L-glufosinate ammonium, thereby realizing in-situ de-racemization of the D,L-glufosinate ammonium.

(3) According to the present invention, the D,L-glufosinate ammonium can be directly used as the substrate for resolution without an expensive resolution reagent, synthesis of glufosinate ammonium derivatives, and steps of separation, de-racemization, re-resolution, etc. of the D-glufosinate ammonium.

DETAILED DESCRIPTION OF THE EMBODIMENTS

Figure 1:
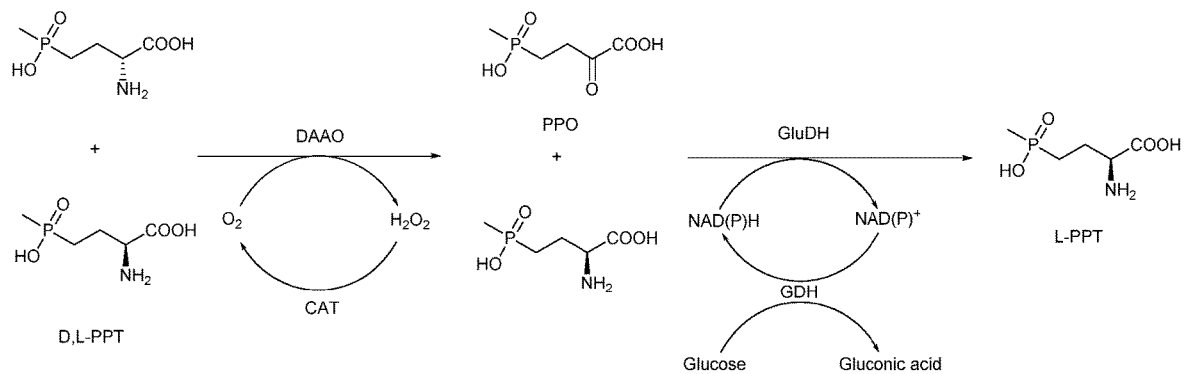
FIG. 1 is a reaction formula (a glucose dehydrogenase coenzyme cycling system) for synthesis of L-glufosinate ammonium by de-racemization.
Figure 2:
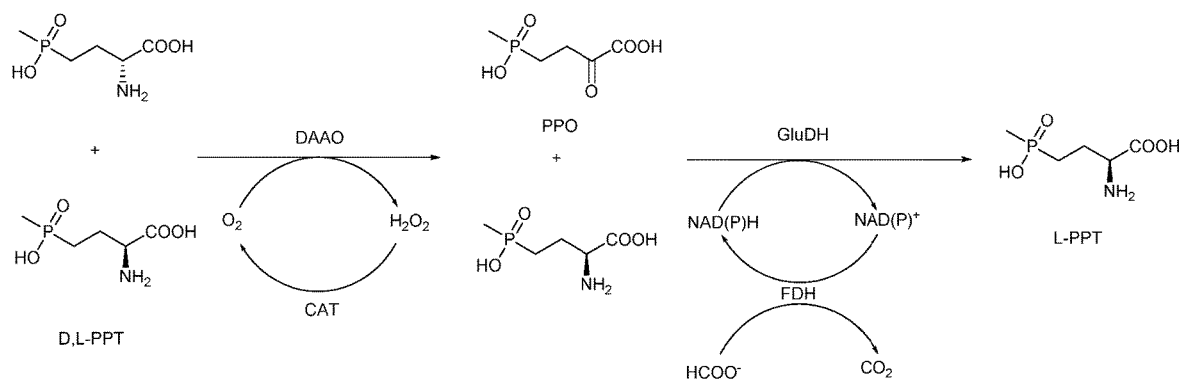
FIG. 2 is a reaction formula (a formate dehydrogenase coenzyme cycling system) for synthesis of L-glufosinate ammonium by de-racemization.
Figure 3:
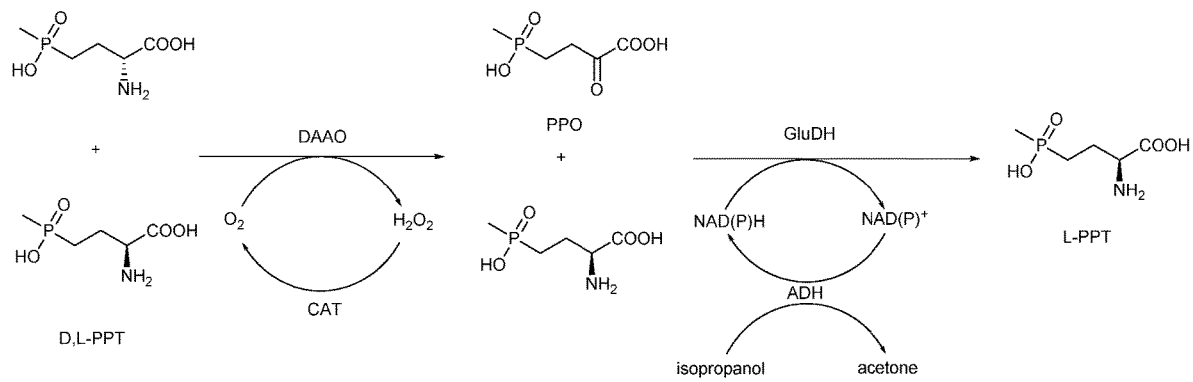
FIG. 3 is a reaction formula (an alcohol dehydrogenase coenzyme cycling system) for synthesis of L-glufosinate ammonium by de-racemization.

In reagents used in upstream genetic engineering, genome extraction kits, plasmid extraction kits, and deoxyribonucleic acid (DNA) purification and recovery kits used in the examples of the present invention were purchased from Corning Life Sciences (Wujiang) Co., Ltd.; one-step cloning kits were purchased from Vazyme Co., Ltd.; *E.coli* DH5α, *E. coli* BL21 (DE3), plasmid pET-24a (+), etc. were purchased from Shanghai Xuguan Biotechnology Development Co., Ltd.; DNA markers, low-molecular-weight standard proteins, protein glues, etc. were purchased from Beijing GenStar Co., Ltd.; and primer synthesis and sequencing were completed by Hangzhou Qingke Zixi Biotechnology Co., Ltd. Referring to the product manual for the usage of the above reagents.

A reagent 2-carbonyl-4-[hydroxy(methyl)phosphonyl]butanoic acid (PPO for short) used in a downstream catalytic process was synthesized in a laboratory; D,L-glufosinate ammonium was purchased from the company Sigma-Aldrich; and other commonly used reagents were purchased from Sinopharm Chemical Reagent Co., Ltd.

According to the present invention, the progress of a reaction was detected by high performance liquid chromatography (HPLC), and the PPO was analyzed. In HPLC analysis, a chromatographic column AQ-C18 was used; a column temperature was 30° C.; a flow rate was 1 mL/min; a detection wavelength was 205 nm; and in a mobile phase, 50 mM $(NH_4)_2HPO_4$ was added with 1% of a 10% tetrabutylammonium bromide aqueous solution, pH was adjusted to 3.8 with phosphoric acid, and 12% acetonitrile was added.

The content of two configurations of glufosinate ammonium was checked by chiral HPLC analysis, in which a chromatographic column Pntulips QS-C18 was used; a ratio of a mobile phase being a 50 mM ammonium acetate solution to methanol was equal to 9 to 1; a detection wavelength was 338 nm; a flow rate was 1 mL/min; and a column temperature was 30° C. In a derivatization reagent, 0.1 g of o-phthalaldehyde and 0.12 g of N-acetyl-L-cysteine were respectively weighed, 10 ml of ethanol was used to assist in dissolution, and 40 ml of a 0.1 M boric acid buffer (pH 9.8) was added. Shaking was performed for full dissolution, and storage was performed in a refrigerator at 4° C. for later use (no more than 3 days). In derivatization reaction and determination, 200 μL of a sample was taken, 400 μL of a derivatization reagent was added and uniformly mixed, heat preservation was performed at 30° C. for 5 min, 400 μL of ultrapure water was added for mixing, and 10 μL of a sample was injected for analysis.

EXAMPLE 1

One. Culture of engineered bacteria

Engineered bacteria were activated by plate scribing, then a single bacterial colony was inoculated into 10 mL of a Luria-Bertani (LB) liquid medium containing 50 μg/mL of kanamycin, and shake culture was performed at 37° C. for 10 hours. 2% of the inoculated single bacterial colony was transferred to 50 mL of an LB liquid medium containing 50 μg/mL of kanamycin, shake culture was performed at 37° C. until $OD_{600}$ reaches about 0.8, isopropyl-β-d-thiogalactoside (IPTG) with a final concentration of 0.5 mM was added, and shake culture was performed at 28° C. for 12 hours. After the culture, a culture solution was centrifuged at 8,000 rpm for 10 minutes, a supernate was discarded, and bacteria were collected and stored in an ultra-low-temperature refrigerator at −80° C. for later use.

Two. Preparation of a crude enzyme solution

The bacteria collected after the culture were washed twice with a pH 8 phosphate buffer (50 mM phosphate buffer with pH=8), then the bacteria were added into the phosphate buffer (50 mM) with pH=8 for cell resuspension, and ultrasonic disruption was performed for 30 times under the disruption conditions that the power was 400 W, the time of each disruption was 2 seconds, and the interval time of disruption was 5 seconds. A cell disruption solution was centrifuged at 8,000 rpm at 4° C. for 10 minutes, and precipitates were removed to obtain a supernate that was a crude enzyme solution of recombinant glufosinate ammonium dehydrogenase.

Three. Purification of glufosinate ammonium dehydrogenase

A crude enzyme solution was combined with an Ni affinity chromatography resin equilibrated with a loading buffer (50 mM phosphate buffer with pH=8, containing 500 mM NaCl and 20 mM imidazole), then was washed with a wash buffer (50 mM phosphate buffer with pH=8, containing 50 mM imidazole and 500 mM NaCl) to be substantially free of impure protein, and was eluted with an elution buffer (50 mM phosphate buffer with pH=8, containing 200 mM imidazole and 500 mM NaCl), and target proteins were collected; the purity was identified by electrophoresis, then the target proteins were combined, and dialysis was performed with a dialysis buffer (50 mM phosphate buffer with pH=8) for 24 hours; a retentate was taken and the protein content was determined by Coomassie brilliant blue to be 2.7 mg/mL; and the enzyme solution was diluted to a final concentration of 0.5 mg/mL, sub-packaged and cryopreserved at −80° C. to obtain pure recombinant glufosinate ammonium dehydrogenase.

Glufosinate ammonium dehydrogenase mutants, other enzymes and co-expression strains were also prepared by the method as described above.

EXAMPLE 2

Determination of specific enzyme activity of glufosinate ammonium dehydrogenase and its mutants A unit (U) for enzyme activity was defined as follows: the amount of enzyme required to generate 1 μmol of L-glufosinate ammonium per minute at 35° C. and pH 7.4 was defined as a unit for enzyme activity, U. Specific enzyme activity was defined as an activity unit per milligram of enzyme protein, U/mg.

Standard conditions for enzyme activity detection were as follows: 100 mM 2-carbonyl-4-(hydroxymethylphosphinyl)-butanoic acid, 10 mM NADPH, and an appropriate amount of enzyme solution reacted at 30° C., pH 7.4, and 600 rpm for 10 minutes, samples were treated and HPLC detection and analysis were performed.

The protein concentration was determined with a bicinchoninic acid (BCA) protein assay kit (Nanjing Keygen Biotechnology Development Co., Ltd., Nanjing).

EXAMPLE 3

Construction and screening of a glufosinate ammonium dehydrogenase mutant library One) Construction of recombinant bacteria A gene sequence of glufosinate ammonium dehydrogenase (GenBank Number: WP_101496154) derived from polycultured denitrifying thiobacteria (*Thiopseudomonas denitrificans*) was codon-optimized, sent to Sangon Bioengineering (Shanghai) Co., Ltd. for full gene synthesis, and cloned into a recombinant expression plasmid pETduet-1 to construct plasmid pETduet-1 -GluDH. Recombinant plasmids were verified by sequencing and then transferred into an expression host *E. coli* BL21(DE3) for subsequent expression of recombinant glufosinate ammonium dehydrogenase. The codon-optimized glufosinate ammonium dehydrogenase had a gene sequence as shown in SEQ ID No.1 and an amino acid sequence as shown in SEQ ID No.2.

Two) Construction of a glufosinate ammonium dehydrogenase mutant library

In first step, a glufosinate ammonium dehydrogenase mutant library was constructed by error-prone polymerase chain reaction (PCR), PCR amplification was performed with plasmids of glufosinate ammonium dehydrogenase derived from polycultured denitrifying thiobacteria (*Thiopseudomonas denitrificans*) as a template, and a T7 promoter and a T7 terminator as primers (Table 1), and mutations were introduced randomly. A PCR reaction system (50 μL) included 0.5-20 ng of a template, a 1×Taq Buffer (free of $Mg^{2+}$), 0.2 mM deoxynucleotide triphosphate (dNTP), 0.3 mM $MnCl_2$, 2 mM $MgCl_2$, a 0.2 μM primer that is a T7 promoter, a 0.2 μM primer that is a T7 terminator, and 5 U of Taq DNA polymerase. PCR conditions were as follows: (1) pre-denaturation was performed at 95° C. for 5 minutes; (2) denaturation was performed at 94° C. for 50 seconds; (3) annealing was performed at 55° C. for 60 seconds; (4) extension was performed at 72° C. for 120 seconds, and steps (2)-(4) were cycled for 30 times in total; and (5) finally extension was performed at 72° C. for 5 minutes, and storage was performed at 4° C. A PCR product was digested with endonuclease DpnI at 37° C. for 3 hours, then analyzed by agarose gel electrophoresis, and recovered by gel cutting. The recovered PCR product was ligated to a pET-28b (+) vector by T4 ligase, where restriction sites were XbaI and XhoI. The ligated product was transformed and introduced into E. coli BL21 (DE3), spread on an LB plate containing kanamycin (50 μg/mL), and cultured at 37° C. overnight.

A single bacterial colony was picked and cultured in 96-deep-well plates, 1,000 μL of an LB liquid medium (containing kanamycin with a final concentration of 50 μg/mL and IPTG with a final concentration of 1 mM) was added to each of the well plates, and culture was performed at 37° C. for 18 hours. Bacteria in the 96-deep-well plates were centrifuged for 30 minutes (3,000 rpm, 4° C.), a supernate was discarded, and the bacteria were resuspended with 1.5 mL of a sodium dihydrogen phosphate-disodium hydrogen phosphate buffer (200 mM, pH 7.0). 500 μL of a bacterial suspension solution was taken out and put into a new 96-deep-well plate; a substrate reaction solution was added to each well, where a reaction system was 100 mM PPO, and coenzyme was 1 mM NADPH; screening was performed by a microplate reader, where a primary screening method was a derivatization method (*Process Biochemistry*. 2019, 76, 136-141), and a screening reagent included 0.013 g of o-phthalaldehyde and 0.032 g of N-acetyl-L-cysteine; and the screening reagent was dissolved in a boric acid buffer with pH=9.8 to a constant volume of 50 mL, was mixed with a reaction solution according to a ratio of 1: 1, reacted for 30 seconds, and screened strains with higher fluorescence values than original strains at an emission wavelength of 340 nm and an excitation wavelength of 455 nm. Mutant strains obtained by screening were checked for glufosinate ammonium by chiral HPLC analysis, and sent for sequencing. It was verified that a mutant strain pETduet-1-GluDHV377S was obtained and had a specific enzyme activity of 84.69 U/mg, while a specific enzyme activity of wild-type glufosinate ammonium dehydrogenase was 0.78 U/mg.

A glufosinate ammonium dehydrogenase mutant of a mutant strain V377S had a gene sequence as shown in SEQ ID No.3 and an amino acid sequence as shown in SEQ ID No.4.

TABLE 1

Primer design table

| Primer name | Primer sequence (5' to 3') |
|---|---|
| T7 promoter | TAATACGACTCACTATAGGG (SEQ ID No. 5) |
| T7 terminator | TGCTAGTTATTGCTCAGCGG (SEQ ID No. 6) |

EXAMPLE 4

Construction of a variety of recombinant bacteria

One) Construction of recombinant bacteria for catalase

A sequence of a strain derived from *Parageobacillus* and annotated as catalase (CAT) was codon-optimized for full gene synthesis, and an expression plasmid was pET-28b. An insertion sequence was verified by sequencing of pET28b-CAT (an amino acid sequence was as shown in SEQ ID NO.7, and a nucleotide sequence was as shown in SEQ ID NO.8) and then transferred into an expression host E. coli BL21 (DE3) for subsequent expression of recombinase.

Two) Construction of recombinant bacteria for D-amino acid oxidase

An amino acid sequence was as shown in SEQ ID NO.9, and a nucleotide sequence was as shown in SEQ ID NO.10. D-amino acid oxidase derived from *Rhodotorula taiwanensis* was subjected to point mutation to obtain a recombinant D-amino acid oxidase mutant strain (DAAO-M2135-N54V-F58E-D207A-S60T), and the mutant strain was codon-optimized for full gene synthesis to construct recombinant bacteria E. coli BL21(DE3)/pET28b-DAAO-M213S-N54V-F58E-D207A-S60T, where the mutant strain had an amino acid sequence as shown in SEQ ID NO.9 and a nucleotide sequence as shown in SEQ ID NO.10.

Three) Construction of recombinant bacteria for glucose dehydrogenase

A strain of recombinant glucose dehydrogenase (GDH) derived from *Exiguobacterium sibiricum* was codon-optimized for full gene synthesis to construct recombinant bacteria E. coli BL21(DE3)/pET28b-GDH, where an amino acid sequence was as shown in SEQ ID NO.11, and a nucleotide sequence was as shown in SEQ ID NO.12.

Four) Construction of recombinant bacteria for formate dehydrogenase

A strain of formate dehydrogenase (FDH) derived from *Lactobacillus buchneri* was codon-optimized for full gene synthesis, an expression plasmid was pET-28b, and recombinant bacteria E. coli BL21(DE3)/pET28b-FDH were constructed, where an amino acid sequence was as shown in SEQ ID NO.13, and a nucleotide sequence was as shown in SEQ ID NO.14.

Five) Construction of recombinant bacteria for alcohol dehydrogenase

A strain of alcohol dehydrogenase (ADH) derived from *Lactobacillus brevis* was codon-optimized for full gene synthesis, an expression plasmid was pET-28b, and recombinant bacteria E. coli BL21(DE3)/pET28b-ADH were constructed, where an amino acid sequence was as shown in SEQ ID NO.15, and a nucleotide sequence was as shown in SEQ ID NO.16.

EXAMPLE 5

Construction of co-expression strains

One) Construction of a co-expression strain containing a hydrogen peroxide system A mutant strain DAAO-M213S-N54V-F58E-D207A-S60T was ligated to a multi-cloning-site vector pCDFduet-1 by a one-step cloning kit, where restriction sites were NcoI and HindIII, and one-step cloning primers were C1-F and C1-R (Table 2); and a plasmid pCDFduet-1-DAAO was constructed. On the basis of the plasmid pCDFduet-1-DAAO, CAT was ligated to a second cloning site of the multi-cloning-site vector pCDFduet-1 by a one-step cloning kit, where restriction sites were NdeI and XhoI, and one-step cloning primers were C2-F and C2-R; and a plasmid pCDFduet-1-DAAO-CAT was constructed, and a co-expression strain E. coli BL21(DE3)/pCDFduet-1-DAAO-CAT was constructed.

Two) Construction of a co-expression strain containing a glucose dehydrogenase coenzyme cycling system On a vector pETduet-1-GluDHV377S, GDH was ligated to a second cloning site of a multi-cloning-site vector pETduet-1 by a one-step cloning kit, where restriction sites were NdeI and XhoI, and one-step cloning primers were C3-F and C3-R; and a plasmid pETduet-1-GluDHV377S-

GDH was constructed, and a co-expression strain *E. coli* BL21(DE3)/pETduet-1-GluDHV377S-GDH was constructed.

Three) Construction of a co-expression strain containing a formate dehydrogenase coenzyme cycling system On a vector pETduet-1-GluDHV377S, FDH was ligated to a second cloning site of a multi-cloning-site vector pETduet-1 by a one-step cloning kit, where restriction sites were NdeI and XhoI, and one-step cloning primers were C4-F and C4-R; and a plasmid pETduet-1-GluDHV377S-FDH is constructed, and a co-expression strain *E. coli* BL21(DE3)/pETduet-1-GluDHV377S-FDH was constructed.

Four) Construction of a co-expression strain containing an alcohol dehydrogenase coenzyme cycling system On a vector pETduet-1-GluDHV377S, ADH was ligated to a second cloning site of a multi-cloning-site vector pETduet-1 by a one-step cloning kit, where restriction sites were NdeI and XhoI, and one-step cloning primers were C5-F and C5-R; and a plasmid pETduet-1-GluDHV377S-ADH was constructed, and a co-expression strain *E. coli* BL21(DE3)/pETduet-1-GluDHV377S -ADH was constructed.

TABLE 2

Design of primers for construction of co-expression strains

| Primer name | Primer sequence (5'-3') |
| --- | --- |
| C1-F | ACTTTAATAAGGAGATATACCATGGATGCATAGCCAGAA (SEQ ID No. 17) |
| C1-R | ACTGCGGCCGCAAGCTTAGTGGTGGTGGTGGTGGTG (SEQ ID No. 18) |
| C2-F | TAAGAAGGAGATATAATGGCGGACACCAAGAAACTG (SEQ ID No. 19) |
| C2-R | GGTTTCTTTACCAGATTACGCGTTGGTAATAACATCGTC (SEQ ID No. 20) |
| C3-F | TTATACTACCAGCGTAATGCTTTACCAAAAGAA (SEQ ID No. 21) |
| C3-R | TTCTTTTGGTAAAGCATTACGCTGGTAGTATAA (SEQ ID No. 22) |
| C4-F | TAAGAAGGAGATATACATATGACCAAAGTTCTGGCCGTG C (SEQ ID No. 23) |
| C4-R | GGTTTCTTTACCAGACTCGAGTTATTTTTCTGCTTCGCC GC (SEQ ID No. 24) |

TABLE 2-continued

Design of primers for construction of co-expression strains

| Primer name | Primer sequence (5'-3') |
| --- | --- |
| C5-F | TAAGAAGGAGATATACATATGATGAGCAACCGTCTGGAC GG (SEQ ID No. 25) |
| C5-R | TTTACCAGACTCGAGGGTACCTTATTGCGCGGTATAGCC ACC (SEQ ID No. 26) |
| PDC-F | AAGGAGATATACCATGGGCATGCATAGCCAGAAACGTGT (SEQ ID No. 27) |
| PDC-R | GTTTCTTTACCAGACTCGAGTTACGCGTTGGTAATAACA (SEQ ID No. 28) |
| PPF-F | AAGGAGATATACCATGGGCATGATTGAGAGCGTCGAGTC (SEQ ID No. 29) |
| PPF-R | GTTTCTTTACCAGACTCGAGTTATTTTTCTGCTTCGCCG (SEQ ID No. 30) |

Five) Construction of a co-expression strain (containing an alcohol dehydrogenase coenzyme cycling system) for de-racemization of glufosinate ammonium The previously constructed plasmids pCDFduet-1-DAAO-CAT and pETduet-1-GluDHV377S-ADH were introduced into *E. coli* BL21(DE3) to construct a dual-plasmid racemic co-expression strain *E. coli* BL21(DE3)/pCDFduet-1-DAAO-CAT, pETdue-1-GluDHV377S -ADH.

Six) Construction of a co-expression strain (containing a formate dehydrogenase coenzyme cycling system) for de-racemization of glufosinate ammonium A DAAO-CAT fragment (M1) in the previously constructed plasmid pCDFduet-1-DAAO-CAT of a module 1 was ligated to other multi-cloning-site vectors pETduet-1, pACYCduet-1 and pRSFduet-1 by a one-step cloning kit, where one-step cloning primers were PDC-F and PDC-R; and plasmids pET_M1, pACYC_M1, and pRSF_M1 were obtained (Table 3).

A GluDH-FDH fragment (M2) in the previously constructed plasmid pETduet-1-GluDHV377S-FDH of a module 2 was ligated to other multi-cloning-site vectors pETduet-1, pACYCduet-1 and pRSFduet-1 by a one-step cloning kit, where one-step cloning primers were respectively PPF-F and PPF-R; and plasmids pET_M2, pACYC_M2 and pRSF_M2 were obtained (Table 3).

The plasmids of the two modules were introduced into *E. coli* BL21(DE3) to obtain 12 co-expression strains for de-racemization of glufosinate ammonium (Table 3).

TABLE 3

Co-expression strain (containing formate dehydrogenase coenzyme cycling system) for de-racemization of glufosinate ammonium

| Plasmid M1 of module 1: DAAO_CAT | Plasmid M2 of module 2: GluDH_FDH | Dual plasmids for modules 1 and 2 | Abbreviation for dual plasmids | Co-expression strain for de-racemization |
| --- | --- | --- | --- | --- |
| pCDF_M1 | pCDF_M2 | pCDF_M1-pET_M2 | SA | *E. coli*(SA) |
| pET_M1 | pET_M2 | pCDF_M1-pACYC_M2 | SC | *E. coli*(SC) |
| pACYC_M1 | pACYC_M2 | pCDF_M1-pRSF_M2 | SK | *E. coli*(SK) |
| pRSF_M1 | pRSF_M2 | pET_M1-pCDF_M2 | AS | *E. coli*(AS) |
| | | pET_M1-pACYC_M2 | AC | *E. coli*(AC) |
| | | pET_M1-pRSF_M2 | AK | *E. coli*(AK) |
| | | pACYC_M1-pCDF_M2 | CS | *E. coli*(CS) |
| | | pACYC_M1-pET_M2 | CA | *E. coli*(CA) |
| | | pACYC_M1-pRSF_M2 | CK | *E. coli*(CK) |

TABLE 3-continued

Co-expression strain (containing formate dehydrogenase coenzyme cycling system) for de-racemization of glufosinate ammonium

| Plasmid M1 of module 1: DAAO_CAT | Plasmid M2 of module 2: GluDH_FDH | Dual plasmids for modules 1 and 2 | Abbreviation for dual plasmids | Co-expression strain for de-racemization |
|---|---|---|---|---|
| | | pRSF_M1-pCDF_M2 | KS | E. coli(KS) |
| | | pRSF_M1-pET_M2 | KA | E. coli(KA) |
| | | pRSF_M1-pACYC_M2 | KC | E. coli(KC) |

EXAMPLE 6

Preparation of L-glufosinate ammonium (containing a glucose dehydrogenase (GDH) coenzyme cycling system) by dual-bacteria and multi-enzyme de-racemization A co-expression strain E. coli BL21(DE3)/pCDFduet-1-DAAO-CAT capable of expressing D-amino acid oxidase and catalase (CAT) was cultured according to the method in Example 4. A co-expression strain E. coli BL21(DE3)/pETduet-1-GluDHV377S-GDH capable of expressing glufosinate ammonium dehydrogenase GluDHV377S and glucose dehydrogenase (GDH) was cultured according to the method in Example 4.

In a 1 L reactor, 600 mL of a phosphate buffer with pH=8, containing 400 mM D,L-PPT, a defoamer, and 20 g/L of bacteria E. coli BL21(DE3)/pCDFduet-1-DAAO-CAT, was added at 30° C., air was introduced at 2 L/min, a reaction was performed for 14 hours, then 20 g/L of bacteria E. coli BL21(DE3)/pETduet-1-GluDHV377S-GDH and 250 mM glucose were added, pH was controlled to 8 by ammonia water, a reaction was performed for 15 hours, and liquid phase detection showed that a concentration of D-PPT was 0 mM, a conversion rate of D-PPT was 99.9%, a concentration of PPO was 2 mM, a concentration of L-PPT was 398 mM, and an ee value of a glufosinate ammonium product was 99.9%.

EXAMPLE 7

Preparation of L-glufosinate ammonium (containing a formate dehydrogenase (FDH) coenzyme cycling system) by dual-bacteria and multi-enzyme de-racemization A co-expression strain E. coli BL21(DE3)/pCDFduet-1-DAAO-CAT capable of expressing D-amino acid oxidase and catalase (CAT) was cultured according to the method in Example 4. A co-expression strain E. coli BL21(DE3)/pETduet-1-GluDHV377S-FDH capable of expressing glufosinate ammonium dehydrogenase GluDHV377S and formate dehydrogenase (FDH) was cultured according to the method in Example 4.

In a 1 L reactor, 600 mL of a phosphate buffer with pH=8, containing 400 mM D,L-PPT, a defoamer, 20 g/L of bacteria E. coli BL21(DE3)/pCDFduet-1-DAAO-CAT, 20 g/L of bacteria E. coli BL21(DE3)/pETduet-1-GluDHV377S-FDH, 0.05 mM NADP and 250 mM ammonium formate, was added at 30° C., air was introduced at 2 L/min, pH was controlled to 8 by ammonia water, a reaction was performed for 30 hours, and liquid phase detection showed that a concentration of D-PPT was 0 mM, a conversion rate of D-PPT was 99.9%, a concentration of PPO was 8 mM, a concentration of L-PPT was 392 mM, and an ee value of a glufosinate ammonium product was 99.9%.

EXAMPLE 8

Preparation of L-glufosinate ammonium (containing an alcohol dehydrogenase (ADH) coenzyme cycling system) by dual-bacteria and multi-enzyme de-racemization A co-expression strain E. coli BL21(DE3)/pCDFduet-1-DAAO-CAT capable of expressing D-amino acid oxidase and catalase (CAT) was cultured according to the method in Example 4. A co-expression strain E. coli BL21(DE3)/pETduet-1-GluDHV377S-ADH capable of expressing glufosinate ammonium dehydrogenase GluDHV377S and alcohol dehydrogenase (ADH) was cultured according to the method in Example 4.

In a 1 L reactor, 600 mL of a phosphate buffer with pH=8, containing 400 mM D,L-PPT, 20 g/L of bacteria for D-amino acid oxidase, 20 g/L of bacteria for catalase (CAT), 5 g/L of bacteria pETduet-1-GluDHV377S for glufosinate ammonium dehydrogenase, 40 g/L of bacteria for alcohol dehydrogenase (ADH), 0.05 mM NADP and 250 mM isopropanol, was added at 30° C., air was introduced at 2 L/min, pH was controlled to 8 by ammonia water, a reaction was performed for 30 hours, and liquid phase detection showed that a concentration of D-PPT was 0 mM, a conversion rate of D-PPT was 99.9%, a concentration of PPO was 15 mM, a concentration of L-PPT was 385 mM, and an ee value of a glufosinate ammonium product was 99.9%.

EXAMPLE 9

Preparation of L-glufosinate ammonium (containing an alcohol dehydrogenase (ADH) coenzyme cycling system) by single-bacteria and multi-enzyme de-racemization A co-expression strain E. coli BL21(DE3)/pCDFduet-1-DAAO-CAT-pETduet-1-GluDHV377S-ADH capable of expressing D-amino acid oxidase, catalase (CAT), glufosinate ammonium dehydrogenase GluDHV377S and alcohol dehydrogenase (ADH) was cultured according to the method in Example 4.

In a 1 L reactor, 600 mL of a phosphate buffer with pH=8, containing 400 mM D,L-PPT, 40 g/L of a co-expression recombinant strain E. coli BL21 (DE3)/pCDFduet-1-DAAO-CAT-pETduet-1-GluDHV377S-ADH and 250 mM isopropanol, was added at 30° C., air was introduced at 2 L/min, pH was controlled to 8 by ammonia water, a reaction was performed for 30 hours, and liquid phase detection showed that a concentration of D-PPT was 0 mM, a conversion rate of D-PPT was 99.9%, a concentration of PPO was 20 mM, a concentration of L-PPT was 380 mM, and an ee value of a glufosinate ammonium product was 99.9%.

EXAMPLE 10

Preparation of L-glufosinate ammonium (containing a formate dehydrogenase (FDH) coenzyme cycling system) by single-bacteria and multi-enzyme de-racemization 12 co-expression strains E. coli(SA), E. coli(SC), E. coli(SK), E. coli(AS), E. coli(AC), E. coli(AK), E. coli(CS), E. coli(CA), E. coli(CK), E. coli(KS), E. coli(KA) and E. coli(KC) capable of expressing D-amino acid oxidase, catalase (CAT), glufosinate ammonium dehydrogenase GluDHV377S and formate dehydrogenase (FDH) were cultured according to the method in Example 3, and bacterial cells were collected by centrifugation.

In 12 groups of 1 L reactors, 600 mL of a phosphate buffer with pH=8, containing 400 mM D,L-PPT, 0.05 mM NADP and 250 mM ammonium formate, was added at 30° C., 12 co-expression strains E. coli(SA), E. coli(SC), E. coli(SK), E. coli(AS), E. coli(AC), E. coli(AK), E. coli(CS), E. coli(CA), E. coli(CK), E. coli(KS), E. coli(KA) and E. coli(KC) were respectively added, air was introduced at 2 L/min, pH was controlled to 8 by ammonia water, a reaction was performed for 30 hours, and liquid phase detection showed that in 12 reactions, a concentration of D-PPT was 0 mM, a conversion rate of D-PPT was 99.9%, a concentration of L-PPT was 395 mM as a maximum value in a reaction of E. coli(KA) catalysis, and an ee value of a glufosinate ammonium product was 99.9%.

EXAMPLE 11

Separation and extraction of L-glufosinate ammonium

In the pretreatment of hydrogen type 001x7 cationic resin, (1) a column was washed with 2 BV of deionized water at a flow rate of 1.0 BV/h; (2) the column was washed with 2 BV of a 2 M aqueous sodium hydroxide solution at a flow rate of 0.5 BV/h; (3) the column was washed with 2 BV of deionized water at a flow rate of 1.0 BV/h; (4) the column was washed with 2 BV of a 2 M aqueous hydrochloric acid solution at a flow rate of 0.5 BV/h; and (5) the column was washed with 2 BV of deionized water at a flow rate of 1.0 BV/h.

Reaction solutions in Example 11-18 were centrifuged to remove bacteria, pH of a supernate was adjusted by hydrochloric acid to 2, the supernate was subjected to suction filtration, and a filtrate was loaded to pretreated hydrogen type 001x7 cationic resin, where a volume of the column was 120 mL, a column height ratio of the ion-exchange column was 15:1, and a flow rate of sample loading was 1.0 BV/h; and after loading, the column was washed with 4 BV of ultrapure water and then eluted with 2 mol/L of ammonia water at a flow rate of 0.5 BV/h, and an eluate containing L-glufosinate ammonium was collected. The eluate was concentrated under reduced pressure and crystallized at 60° C. and a vacuum degree of 0.075-0.085 MPa to obtain L-glufosinate ammonium with a purity of 98%.

COMPARATIVE EXAMPLE 1

Recombinant bacteria capable of expressing a D-amino acid oxidase mutant strain, catalase (CAT), non-mutated glufosinate ammonium dehydrogenase and alcohol dehydrogenase (ADH) were cultured according to the method in Example 4, and bacterial cells were collected by centrifugation.

In a 1 L reactor, 600 mL of a phosphate buffer with pH=8, containing 400 mM D,L-PPT, a defoamer, 20 g/L of bacteria for D-amino acid oxidase and 20 g/L of bacteria for catalase (CAT), was added at 30° C., air was introduced at 2 L/min, a reaction was performed for 14 hours, then 5 g/L of bacteria pETduet-1-GluDH for glufosinate ammonium dehydrogenase, 20 g/L of bacteria for glucose dehydrogenase (GDH) and 250 mM glucose were added, pH was controlled to 8 by ammonia water, a reaction was performed for 20 hours, and liquid phase detection showed that a concentration of D-PPT was 0 mM, a concentration of PPO was 350 mM, and a concentration of L-PPT was 50 mM.

The invention claimed is:

1. A glufosinate ammonium dehydrogenase mutant that comprises SEQ ID NO: 4.

2. A gene for coding the glufosinate ammonium dehydrogenase mutant according to claim 1, wherein the gene has a nucleotide sequence comprising SEQ ID NO: 3.

3. A recombinant bacterium comprising the gene according to claim 2.

4. A method for preparing L-glufosinate ammonium by biological enzymatic de-racemization, comprising catalyzing D,L-glufosinate ammonium as a raw material by a multi-enzyme catalysis system to obtain L-glufosinate ammonium, wherein the enzyme catalysis system comprises D-amino acid oxidase for catalyzing D-glufosinate ammonium in the D,L-glufosinate ammonium to 2-carbonyl-4-[hydroxy(methyl)phosphonyl]butanoic acid, and a glufosinate ammonium dehydrogenase mutant for catalytically reducing 2-carbonyl-4-[hydroxy (methyl)phosphonyl] butanoic acid to L-glufosinate ammonium, and
    the glufosinate ammonium dehydrogenase mutant comprises SEQ ID NO: 4.

5. The method according to claim 4, wherein an amino acid sequence of the D-amino acid oxidase comprises SEQ ID NO: 9.

6. The method according to claim 4, wherein the enzyme catalysis system further comprises catalase for removing a byproduct including hydrogen peroxide.

7. The method according to claim 4, wherein the enzyme catalysis system further comprises a coenzyme cycling system, and the coenzyme cycling system is at least one of the following:
    (1) a formate dehydrogenase coenzyme cycling system comprising a formate dehydrogenase, formate and a coenzyme;
    (2) a glucose dehydrogenase coenzyme cycling system comprising a glucose dehydrogenase, glucose and a coenzyme; and
    (3) an alcohol dehydrogenase coenzyme cycling system comprising an alcohol dehydrogenase, isopropanol and a coenzyme.

8. The method according to claim 7, wherein an amino acid sequence of the formate dehydrogenase comprises SEQ ID NO: 13; an amino acid sequence of the glucose dehydrogenase comprises SEQ ID NO: 11; or and an amino acid sequence of the alcohol dehydrogenase comprises SEQ ID NO: 15.

* * * * *